US006139420A

United States Patent [19]

Sweeney

[11] Patent Number: 6,139,420
[45] Date of Patent: Oct. 31, 2000

[54] SLOT MACHINE FILL BAG HOLDER AND METHOD FOR USE

[76] Inventor: Colin F. Sweeney, 639 N. Burden Ave., Dubuque, Iowa 52001

[21] Appl. No.: 09/299,775

[22] Filed: Apr. 26, 1999

[51] Int. Cl.[7] .............................. G07D 9/00; G07F 9/10; F16M 11/00; A47B 91/00

[52] U.S. Cl. ......................... 453/63; 194/350; 248/176.1; 248/346.01

[58] Field of Search .............................. 453/63; 194/350; 248/176.1, 346.01

[56] References Cited

U.S. PATENT DOCUMENTS

| | | | |
|---|---|---|---|
| 1,571,608 | 2/1926 | Stillman . | |
| 3,238,953 | 3/1966 | Barbie | 453/63 |
| 3,390,753 | 7/1968 | Bolen et al. . | |
| 4,913,341 | 4/1990 | Bachman . | |
| 4,966,304 | 10/1990 | Kelly . | |
| 5,044,483 | 9/1991 | Stefan . | |
| 5,050,827 | 9/1991 | Christie et al. | 248/176.1 |
| 5,267,892 | 12/1993 | Takemoto et al. . | |
| 5,297,598 | 3/1994 | Rasmussen . | |
| 5,678,679 | 10/1997 | Berman . | |
| 5,799,914 | 9/1998 | Chivallier et al. | 248/176.1 |
| 5,830,056 | 11/1998 | Adams et al. | 453/63 |

FOREIGN PATENT DOCUMENTS

| | | | |
|---|---|---|---|
| 147338 | 1/1904 | Germany | 194/350 |

*Primary Examiner*—Robert P. Olszewski
*Assistant Examiner*—Bryan Jaketic
*Attorney, Agent, or Firm*—Daniel A. Rosenberg; Kent A. Hevink; Davis Brown

[57] ABSTRACT

A fill bag holder and method for holding a fill bag within the body (interior) of a slot machine. In the preferred embodiment, the fill bag rests on a bag support and the bag support is supported by a support bracket. The support bracket can be further braced by an angle support. The fill bag holder is attached to the interior of the slot machine. The fill bag holder holds a fill bag above the coin hopper of the slot machine to facilitate quicker refilling of the coin hopper during play.

20 Claims, 3 Drawing Sheets

SLOT MACHINE FILL BAG HOLDER AND METHOD FOR USE

BACKGROUND

The present invention relates to a fill bag holder for coin-operated machines. More particularly, this fill bag holder makes the process of filling coin hoppers in slot machines quicker by storing a fill bag in the body of the slot machine.

In a casino slot machine, coins released by the machine to the player, typically at the lower front tray of the slot machine, are a player's winnings. The coin hopper, containing the coins which are released as a player's winnings, is periodically refilled by casino personnel at least as often as it becomes empty.

Accomplishing the task of moving coins from the cashier to fill the hopper within a particular slot machine slows or stops play and reduces casino cost efficiency. During peak casino hours traffic problems slow the transfer operation, increase the duration of coin exposure, increase the possibility of theft and pilferage, and cause disruption to the gamblers in the casino. Devices which expedite coin transfer, save slot machine downtime, and provide increased security are eagerly sought by the casinos. The problem of waiting for casino employees to come fill the machines is solved with the current device.

No other devices for use within a slot machine are known which accomplish this task. Other devices dealing with coins or tokens in gaming are exterior to the slot machine. For example, U.S. Pat. No. 5,678,679, Berman, discloses a universal slot machine table with an integrated base that is compartmentalized into a plurality of locking compartments. Coins to resupply the machines are stored in the compartments which are under the base of the table.

SUMMARY

It is an object of this invention to provide a fill bag holder which facilitates quicker resupply of coins to a coin-operated machine.

It is another object of this invention to provide a fill bag holder inside the body of a coin-operated machine, such as a slot machine, which holds a fill bag which is used to resupply a coin hopper.

It is a further object of the invention to provide a method for more quickly filling slot machines by providing a fill bag holder within the body of the coin-operated machine, such as a slot machine, which holds a fill bag which is used to resupply the coin hopper with coins.

It is yet another object of the invention to provide a method for holding a fill bag within the body of a coin-operated machine, such as a slot machine, by providing a fill bag holder within the body of the machine and placing a fill bag onto the fill bag holder.

The fill bag holder is to be used inside of slot machines and the like to hold the fill bags which hold the coins or tokens to fill the coin hopper within the machines. It is intended to speed up the filling process. The customer must wait for a casino employee to come out and fill the coin hopper with coins or tokens when the machine runs out. With the current invention, the waiting process is minimized, and the machine can then be further serviced when not in use. Among the advantages created by this device are increased customer convenience and satisfaction and increased profits for the casino as the machine has less down time.

The terms coins and tokens are meant to be used interchangeably in this disclosure to indicate coin currency minted by a government, tokens, or other substitutes for monetary value.

The fill bag holder is fabricated to fit inside the coin-operated machine. The shape and size of the fill bag holder is such that allows the device to fit inside the body of the machine without interfering with operation of the machine or the filling process, supports the weight of the fill bag, and retains the fill bag on the holder. The methods and materials of fabrication are those which fulfill the purposes listed previously.

DETAILED DESCRIPTION OF INVENTION

Figure 1:
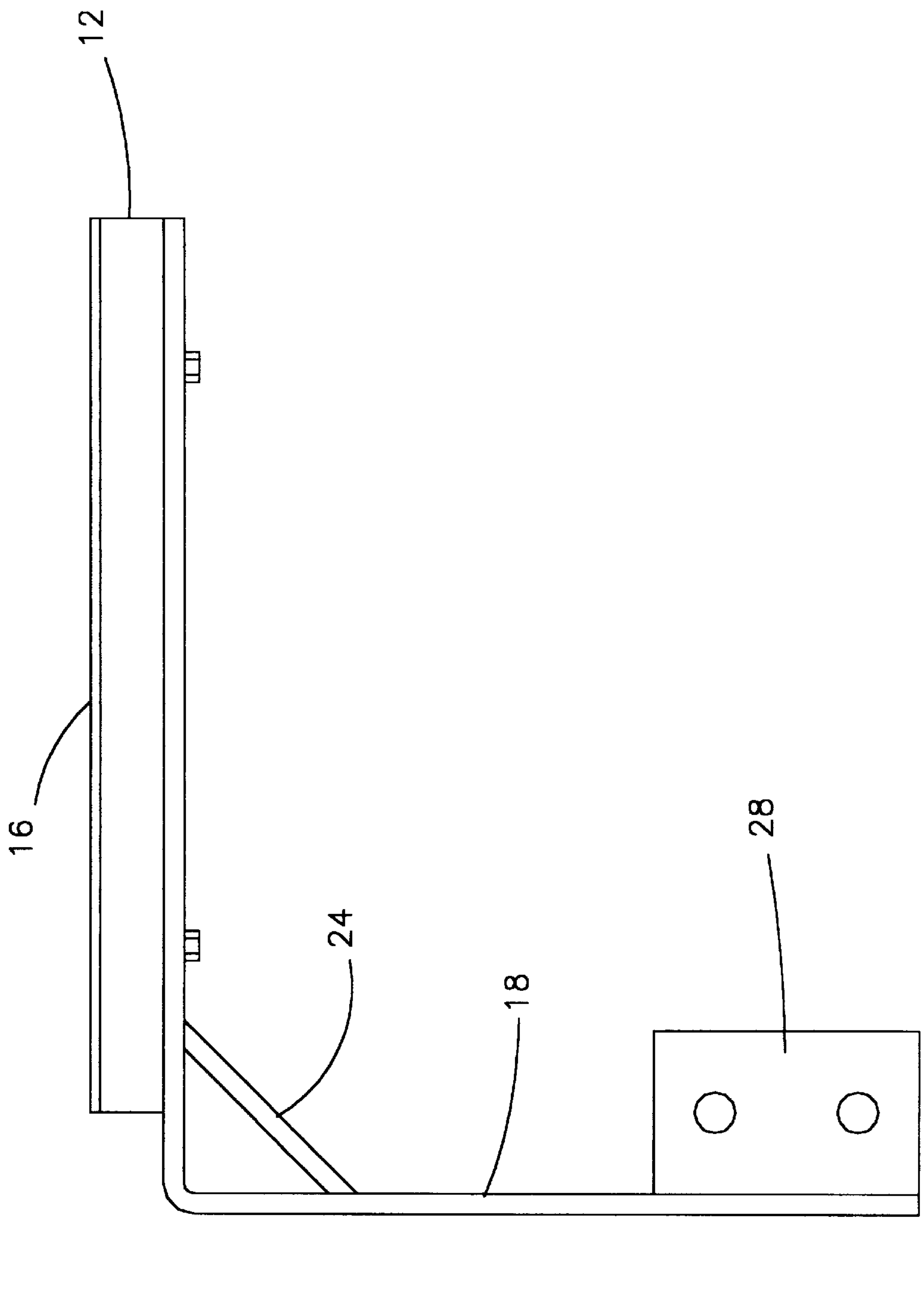
FIG. 1. Front view of the preferred embodiment.
Figure 2:
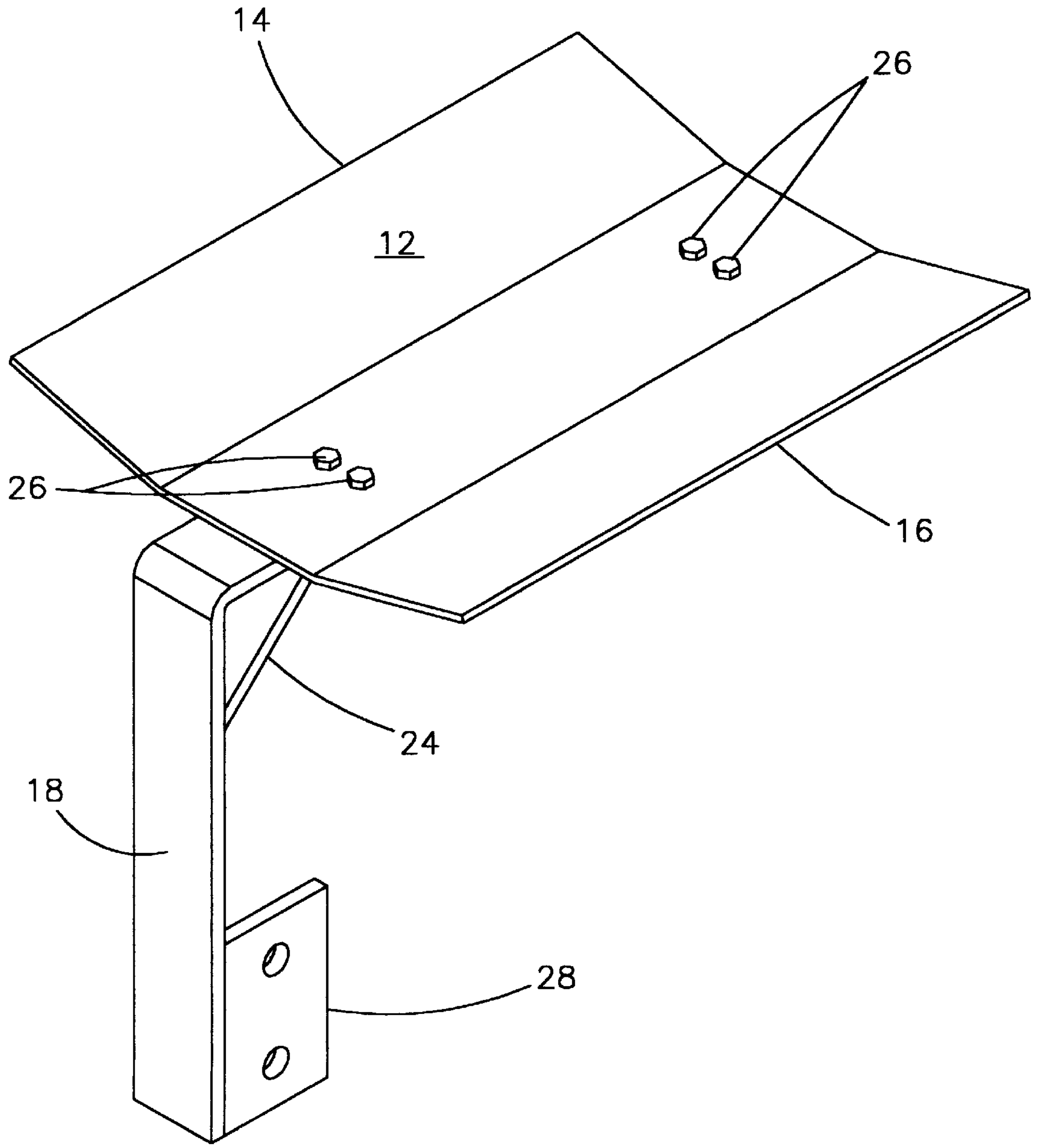
FIG. 2. Isometric view of the preferred embodiment.
Figure 3:
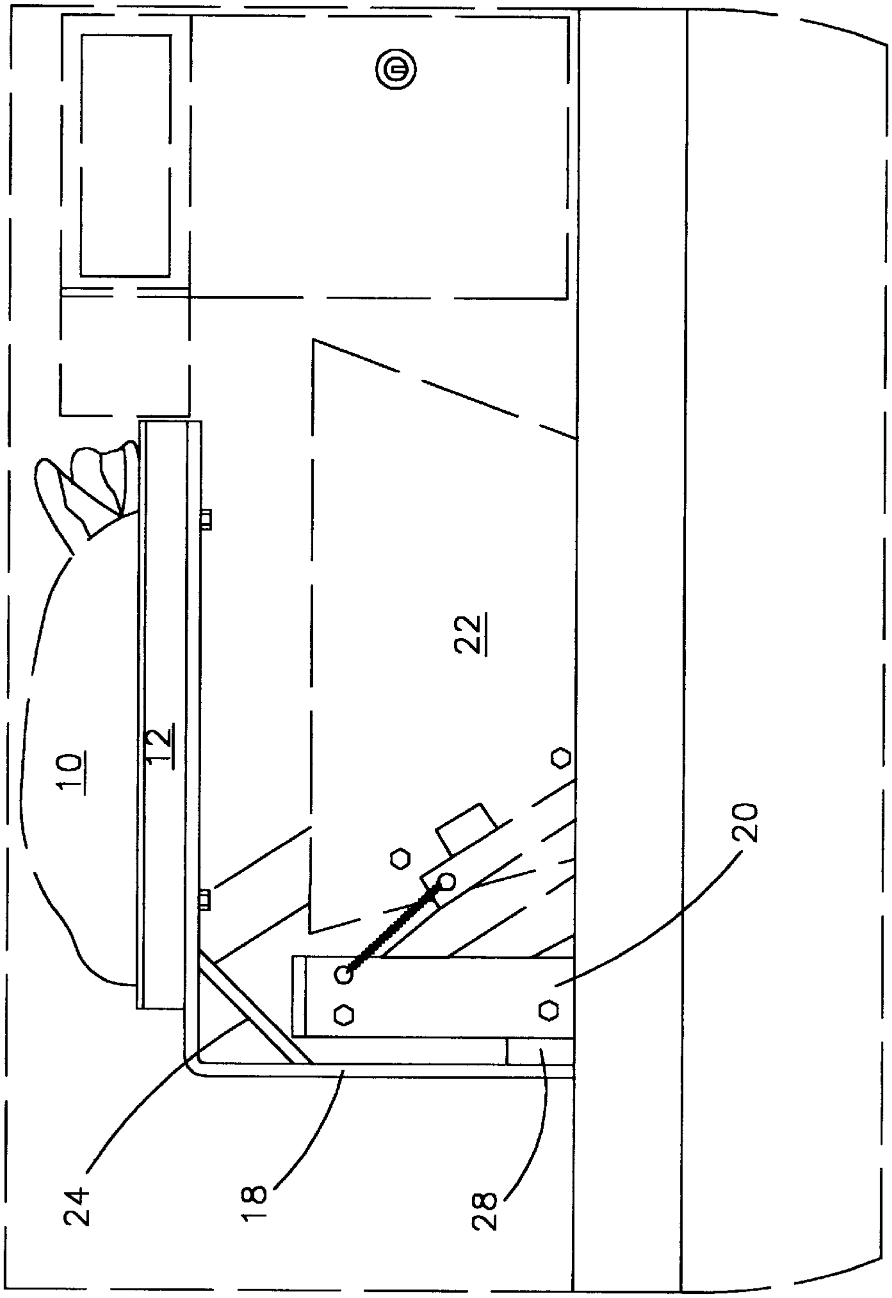
FIG. 3. Preferred embodiment as installed in a slot machine.

FIGS. 1 and 2 show the preferred embodiment of the fill bag holder. FIG. 3 shows the preferred embodiment as installed within a slot machine. The coin, or token, fill bag 10 is supported within the body (interior) of the coin-operated machine. The coin fill "bag" 10 need not actually be a bag because the fill bag holder device can be adapted to work with any container which holds the coins or tokens which are used to fill the coin-operated machine. In the preferred embodiment, the coin-operated machine is a slot machine. However, it is envisioned that similar devices may be helpful in other coin-operated machines where the wait for refilling is unacceptable. Also, in the preferred embodiment the bag 10 is supported by laying on a relatively flat surface. In order to facilitate the bag 10 remaining on the bag support 12, at least one edge may be bent at an angle which keeps the bag 10 from shifting due to the loose coins or tokens contained therein. The preferred embodiment has a pair of opposite sides 14, 16 turned up to keep the bag 10 from rolling off of the bag support 12. The size of this bag support 12 should be adequate to support the fill container 10 while being small enough so as to not interfere with the operation of the machine or not to hinder the actual fill process. Though the drawings show the device with a rectangular bag support 10, the shape need only be that which adequately supports the fill container 10.

The bag support 12 has been made of aluminum though any material which fulfills the purpose of the bag support 12 can be used for fabrication. The rectangular aluminum sheet was bent on a set of opposite sides 14, 16 at approximately a 25° angle up from horizontal. This was found to be adequate to hold a fill bag 10. However, any angle which adequately fulfills the purpose may be used. Alternative ways of keeping the fill bag 10 from rolling off the bag support 12 should be obvious to one skilled in the art. Shapes other than flat plates may be used, however, they will likely not be as cost-effective due to requirement of more fabrication material.

The bag support 12 is itself suspended or supported within the body of the machine with a support bracket 18. This support bracket 18 is shown as attaching below the bag support 12, but can attach at any angle or direction which does not interfere with the installation or use of the fill bag holder. The support bracket 18 is also shown as attaching to the mechanism 20 surrounding the coin hopper 22 within the machine. The support bracket 18 may be attached at any location or position which adequately supports the weight of the fill container 10 and does not interfere with the operation of the machine and adequately allows for installation and use.

The support bracket 18 has been fabricated using hot rolled steel. Any material which fulfills the purpose of the support bracket 18 can be used for fabrication. The steel was bent at a 90° angle to attach under the bag support 12. The support bracket 18 was further supported by an angle support 24 across the 90° angle. This embodiment was found effective for the location within the machine and for supporting the weight of the fill bag 10.

The bag support 12 has been attached to the support bracket 18. This has been accomplished using machine screws 26 secured to the bag support 12 with nuts, but any method or device which fulfills the purpose and is compatible with the materials used for fabrication may be used. Examples include welding, adhesive, screws, bolts, and rivets.

The whole device can be free-standing or attached within the interior of the machine. The preferred embodiment is attached. In the preferred embodiment, an attachment tab 28 is welded to the support bracket 18. This attachment tab 28 is attached at the back of the coin hopper 22 to the mechanism 20 surrounding the hopper 22. The attachment was accomplished using screws and nuts. Any method or device which fulfills the purpose and is compatible with the materials used for fabrication may be used. As long as the device sufficiently supports the weight of the fill bag 10 and is located in such a way as to not interfere with use of the machine or the device and adequately allows for installation, any means of supporting the entire device may be used. It is preferred that the device be removably attached in order to facilitate access to the interior of the machine for repairs and the like.

The device may alternatively be fabricated as one piece. This may be accomplished by various methods, for example, molding or cutting the device out of a flat sheet of material and bending the cut-out to form the desired shape.

Although the invention has been described with respect to a preferred embodiment thereof, it is to be also understood that it is not to be so limited since changes and modifications can be made therein which are within the full intended scope of this invention as defined by the appended claims.

I claim:

1. A device for holding fill bags in the interior of a coin-operated machine comprising:

a coin-operated machine having an interior, a bag support located within said interior of said coin-operated machine, and a support bracket.

2. The device of claim 1 further comprising an attachment tab.

3. The device of claim 1 wherein the coin-operated machine is a gaming machine.

4. The device of claim 3 wherein the gaming machine is a slot machine.

5. The device of claim 1 wherein the bag support has at least one upturned side in order to keep the fill bag from rolling off of the bag support.

6. The device of claim 5 wherein the bag support has a pair of opposite upturned sides which keep the bag from rolling off of the bag support.

7. The device of claim 1 wherein the bag support is at least about 9 inches long.

8. The device of claim 1 wherein the support bracket is attached underneath the bag support.

9. The device of claim 8 further comprising an angle support.

10. The device of claim 1 wherein the device is fabricated from metal.

11. A device for holding fill bags in the interior of a slot machine containing a coin hopper comprising:

a substantially horizontal bag support located in the interior of a slot machine above the coin hopper, wherein the bag support is constructed to hold a fill bag while full of coins, and a substantially vertical support bracket attached to the bag support wherein the bag support is held in a fixed location within the machine interior.

12. The device of claim 11 further comprising an attachment tab which is used to secure the device to the interior of the slot machine.

13. The device of claim 11 wherein the support bracket is located beneath the bag support in order to support the weight of the coins above the coin hopper.

14. The device of claim 11 wherein the bag support is rectangular.

15. The device of claim 11 wherein the bag support has at least one upturned side in order to keep the bag from rolling off of the bag support.

16. A method for filling a coin-operated machine comprising the steps of:

locating a fill bag within the interior of a coin-operated machine, supporting the fill bag within the interior of the coin-operated machine, accessing the interior of the machine to reach the fill bag, and emptying the fill bag into the coin hopper in the machine.

17. The method of claim 16 wherein said fill bag comprises:

a bag support, and a support bracket.

18. A method of holding a coin fill bag within the interior of a slot machine comprising the steps of:

providing a fill bag holder comprising a bag support and a support bracket wherein the fill bag holder is effective for supporting the weight of the fill bag, and placing a fill bag on the bag support of the fill bag holder.

19. The method of claim 18 wherein the bag support has at least one upturned side in order to keep the fill bag from rolling off of the bag support.

20. The method of claim 18 wherein the support bracket is located underneath the bag support.

* * * * *